United States Patent [19]

Fischbeck

[11] Patent Number: 4,509,058
[45] Date of Patent: Apr. 2, 1985

[54] INK JET PRINTING USING HORIZONTAL INTERLACING

[75] Inventor: Kenneth H. Fischbeck, Dallas, Tex.

[73] Assignee: Xerox Corporation, Stamford, Conn.

[21] Appl. No.: 534,952

[22] Filed: Sep. 22, 1983

[51] Int. Cl.³ .......................................... G01D 15/18
[52] U.S. Cl. ......................... 346/1.1; 346/140 R; 400/126
[58] Field of Search ............... 346/1.1, 75, 140 R; 400/126

[56] References Cited

U.S. PATENT DOCUMENTS

| | | | |
|---|---|---|---|
| 4,090,205 | 5/1978 | Huffman | 346/75 |
| 4,314,282 | 2/1982 | Fischbeck et al. | 358/286 |
| 4,349,828 | 9/1982 | Fischbeck | 346/1.1 |
| 4,379,300 | 4/1983 | Fischbeck | 346/1.1 |
| 4,379,301 | 4/1983 | Fischbeck | 346/1.1 |
| 4,380,017 | 4/1983 | Ort | 346/140 |
| 4,382,263 | 5/1983 | Fischbeck et al. | 346/1.1 |
| 4,386,358 | 5/1983 | Fischbeck | 346/1.1 |
| 4,389,652 | 6/1983 | Fischbeck | 346/1.1 |

Primary Examiner—Joseph W. Hartary
Attorney, Agent, or Firm—Richard A. Tomlin

[57] ABSTRACT

Horizontal interlacing is used in an oscillating bar drop-on-demand ink jet printer to improve image quality, particularly in solid black areas. The disclosed system provides a method for printing that allows the image-receiving surface to be forwarded continuously, reducing the requirement for stepwise operation.

1 Claim, 7 Drawing Figures

INK JET PRINTING USING HORIZONTAL INTERLACING

The invention relates to an oscillating bar drop-on-demand ink jet printer where printing occurs while the bar is moving bidirectionally. When using an oscillating bar printer, the placement of drops on the record-receiving surface is affected by the timing of the droplet ejection and the velocity of the record-receiving surface. Where the oscillating bar is oscillated in a direction perpendicular to the movement of the record-receiving surface, a sine wave trace results as is well known (see, for example, U.S. Pat. No. 4,379,300 issued Apr. 5, 1983, to Kenneth H. Fischbeck). A sine wave trace is not normally desirable for the production of printed matter. To eliminate the sine wave trace, it is possible to use intermittent motion of the record-receiving surface and print only when the record-receiving surface is motionless. It is also well known that in a printer design, the use of constant record-receiving surface motion results in a printer having reduced weight, lower power requirements and less noise as compared to a printer using intermittent or stepped movement of the record-receiving surface.

The present concept is directed to the use of horizontal interlacing in an oscillation bar printer. The horizontal interlacing reduces the effects of the sine wave trace on the resultant image and allows a constant feed printer to be used in a wider range of applications than before.

The foregoing advantages and features of the present invention will be apparent from the following more particular description of a preferred embodiment as illustrated in the accompanying drawing wherein.

Figure 1:
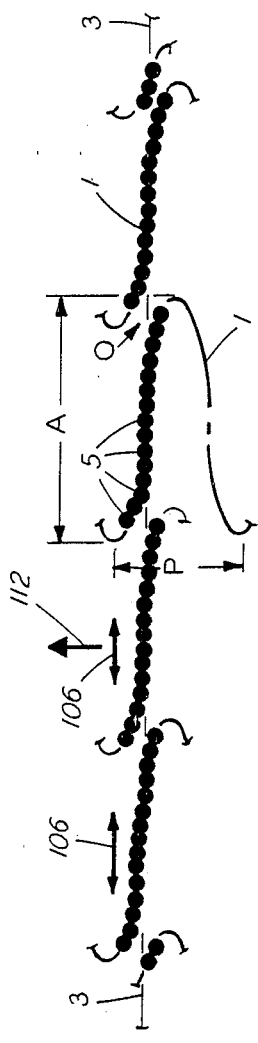
FIG. 1 shows the sine wave trace developed on a record surface by an array of ejectors.

Referring now to FIG. 1, there is shown a representation of the traces resulting from the motion of an oscillating bar printer array which is oscillating in direction 106 superimposed on the motion of the record-receiving surface in direction 112. The resulting sine waves 1 have an amplitude A and a pitch P which are determined by the amplitude and velocity of oscillation of the oscillating bar and the velocity of the record-receiving surface. The dashed line 3 represents the top edge of a dark area it is desired to form on the record-receiving surface. Note that, because of the sine wave effect, the line of ink formed by the droplets on the record-receiving surface is not straight and that there is an offset O at the interface between arrays where adjoining traces meet.

Figure 2A:
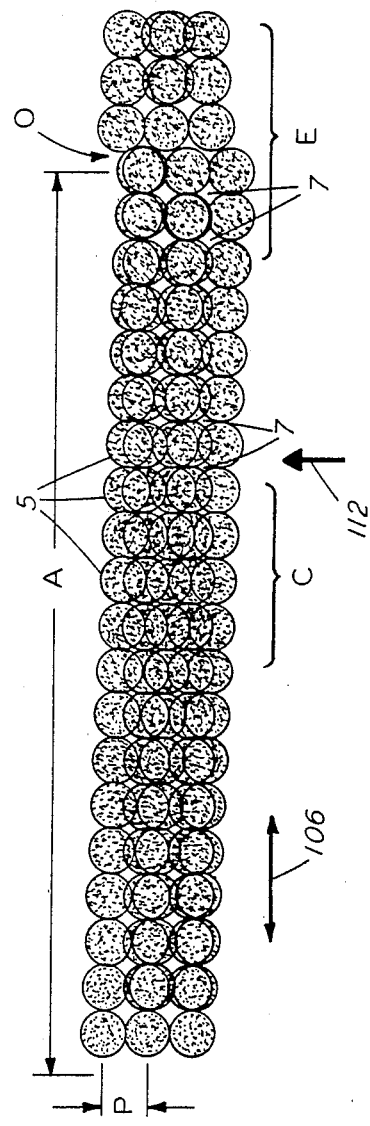
FIGS. 2A and 2B show how the droplets appear on a record surface in prior art systems.
Figure 2B:
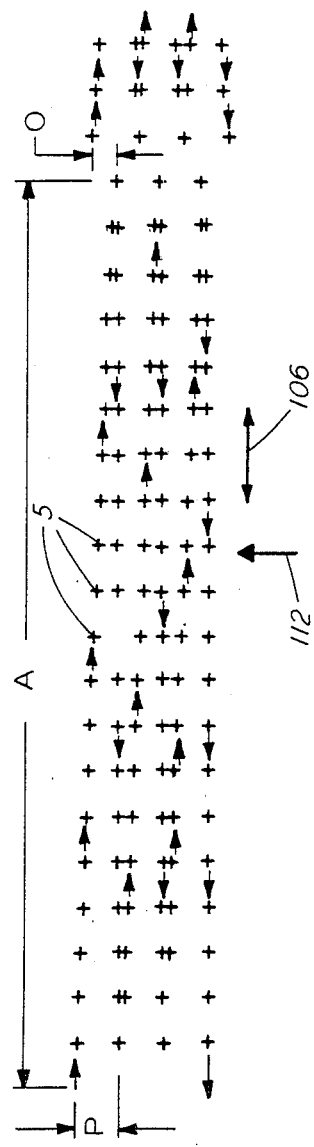

Referring now to FIG. 2A, which is drawn substantially to scale for a single bar ejector array, there is shown the marks of ink 5 on a record-receiving surface for one ejector and a portion of a second ejector. There is shown in FIG. 2A the marks 5 which would result from three left-to-right scans and two right-to-left return scans (see FIG. 2B which shows schematically the center points of the marks 5 and the direction 106 of movement of the oscillating bar). It is assumed that a large dark area is being formed so that the ejector ejects droplets at every possible pixel location. It can be seen that the edge formed by marks 5 is not exactly parallel to direction 106 of oscillation but is slanted due to motion of the record-receiving surface in direction 112. It can also be seen that there is a pronounced offset O between the marks 5 of adjoining ejectors. Where a printer is formed of more than one oscillating bar, these effects are greatly enlarged approaching the amplitude and pitch relationship as shown in FIG. 1. Two effects are noticeable to the observer. First, the edges of dark areas appear jagged due to the offset O between ejectors and also that there is a wave or variation in density across the black or dark area. The second effect can be noted by observing that in the area C in the middle of the ejector scan, there is less white space 7 showing between marks 5 than there is at the edge areas E. This effect is aggravated by the juxtaposition of the areas of larger white spaces 7 of adjoining ejectors. The cause of this effect can be better understood by reference to FIG. 2B. Note that the midpoints of the marks 5 are furthest apart vertically at the right and left extremes of the oscillating bar scan, whereas in the center, the marks 5 are closer together. The present invention is directed to a method of reducing these effects.

Figure 3A:
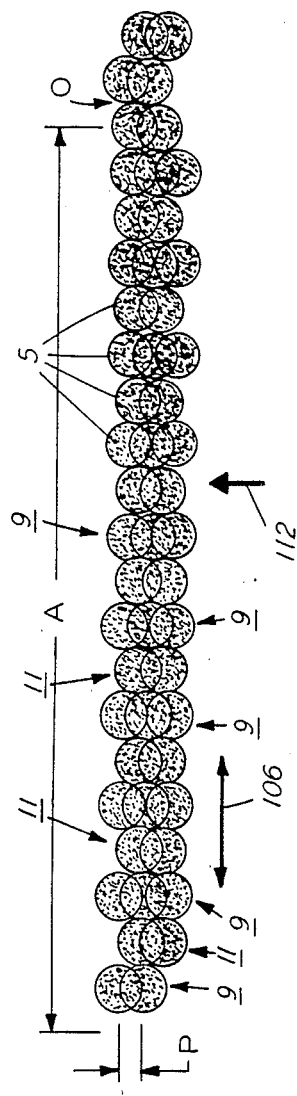
FIGS. 3A and 3B show how the droplets appear on a record surface in accordance with this invention.
Figure 3B:
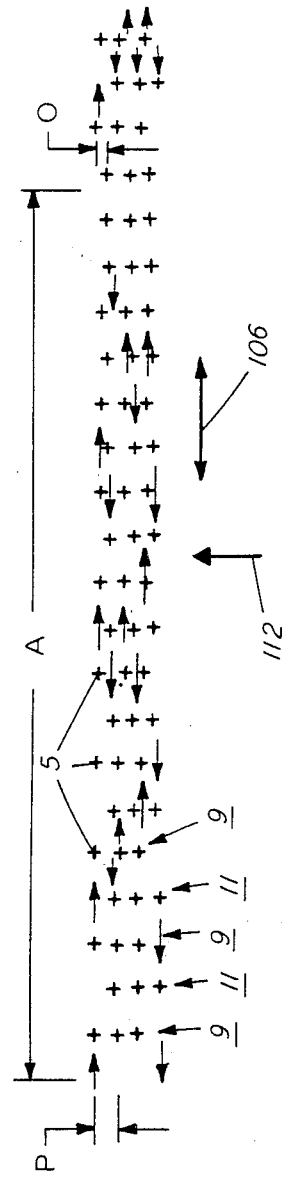

Referring now to FIG. 3A, there is seen a pattern of marks 5 which were formed by three left-to-right and two right-two-left scans in direction 106 by the oscillating bar. Here, however, droplets ejected in the left-to-right scan are offset in the direction 106 from droplets ejected in the right-to-left scan to form separate columns. In FIG. 3A, columns 9 are formed as the ejector moves from left to right, and columns 11 are formed as the ejector moves from right to left as shown in FIG. 3A. Since by necessity a single row of droplets contains about one-half the droplets of the prior art system, it is necessary to reduce the pitch to provide a satisfactory density of final image. Here the pitch has been reduced to where it is about one-half the pitch of the prior art system. Since the pitch is reduced, the slant of the top row is reduced by about one-half as is the offset O. The eye discernability of offset O is reduced, first, because it is smaller and, second, because adjoining marks 5 forming the top row are made up of marks from left-to-right and right-to-left scans which tend to mask the effect of offset O. This feature of forming a row by using marks formed by right-to-left and left-to-right scans is referred to as interlacing. That is, the columns 9 are interlaced with columns 11. Further, as can be seen from FIG. 3B, all droplets are evenly spaced from each other vertically (i.e., parallel to direction 112) providing a uniformity of density of dark areas not obtainable in the prior art. This regularity of density is caused because each column 9, 11 of marks 5 is formed by the ejector as it is moving either from left to right or from right to left, not both, as was the case in the prior art. Each mark 5 is displaced from the next mark 5 in the columns 9, 11 by a distance equal to the pitch. It is also preferred to place the columns 9, 11 equidistant from each other horizontally, i.e., in a direction parallel to direction 106.

In a typical example, marks 5 are of 3 mil diameter, amplitude A is 60 mils. The ejectors 105 are on 60 mil centers. In the prior art, 20 droplets were ejected to each right-to-left and each left-to-right scan, and the pitch was 3 mils, to provide a 330 drops/inch output. FIG. 3A results are obtained by ejecting 10 droplets on each right-to-left and each left-to-right scan and using a pitch of 1½ mils. The droplets were ejected so that columns 9, 11 had centers offset 3 mils from each other horizontally.

Figure 4:
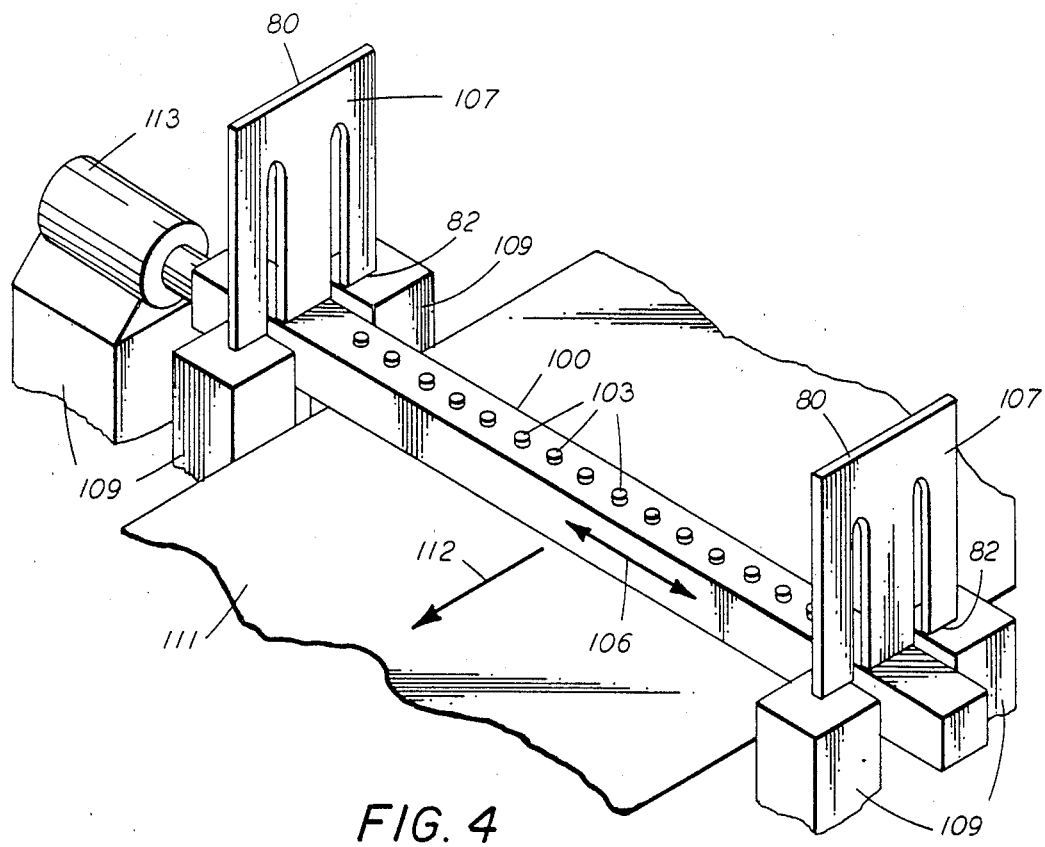
FIG. 4 is a perspective view of an oscillating bar printer in which the present invention is useful.

Referring now to FIG. 4, there is shown an oscillating bar printer. Specifically, there is shown an oscillating bar, referred to hereinafter as a raster input scan/raster output scan (RIS/ROS) support member 100, which may be, for example, of a plastic material. Supported by RIS/ROS member 100 are scanning/reading means represented here by discs 103, which may be, by way of example, photodetectors. Also supported by RIS/ROS support member 100 are marking elements 105 (see FIG. 5), which, in this exemplary instance, are drop-on-demand ink jets. Conveniently, one marking element 105 can be provided for each reading element 103; however, this is not necessary. RIS/ROS support member 100 is suspended for axial oscillatory movement in the directions shown by arrow 106 by flexure mounts 107, which act as multiple compounded cantilever springs around edge 80. Edge 80 also pivots around edge 82. That is, not only does the support member 100 pivot, this double pivoting action keeps RIS/ROS support member 100 in spaced relationship to record-receiving member 111 with a minimum amount of swing or arc over its complete travel. RIS/ROS support member 100 is oscillated by oscillating means 113, which may be, for example, a solenoid. Solenoid 113 is also fixed to base 109 as are flexure mounts 107.

Figure 5:
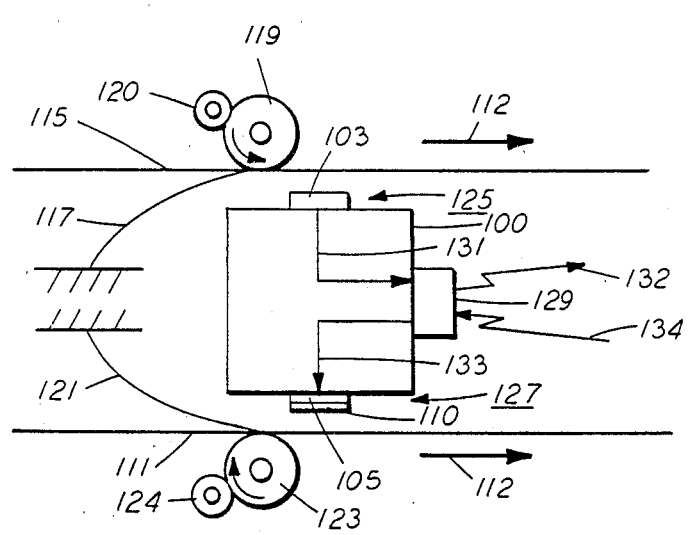
FIG. 5 is a side-sectional schematic representation of the oscillating bar printer of FIG. 3.

Referring now to FIG. 5, there is shown a schematic side view of the oscillating bar printer of FIG. 3 with the base 109, and flexure mounts 107 deleted for purposes of explanation. Document 115, which is to be scanned by photodetectors 103, is guided by leaf-spring fingers 117 into contact with drive guide roller means 119, which, when driven by motor 120, pulls document 115 across the reading path of photodetectors 103 through image-reading station designated generally as 125. Document 115 and roller 119 were not shown in FIG. 4 to simplify understanding of the construction of the oscillating bar printer. Leaf-spring fingers 121 are used to guide record-receiving member 111, which may be, for example, paper, into contact with drive guide roller 123. Roller 123 driven by motor 124 guides and pulls record-receiving member 111 through the image-marking station designated generally as 127. Controller 129 is used to receive the input signal 131 from the photodetectors 103 and to produce an output signal 133 to ink jets 105. Controller 129 is conveniently mounted on oscillating RIS/ROS support member 100.

Where the oscillating bar printer is used as a copier, a document 115 to be copied and a copy sheet 111 are fed into the nips formed by leaf-spring fingers 117 and drive roller 119 and leaf-spring fingers 121 and drive roller 123, respectively. Solenoid 113 is activated causing RIS/ROS support member 100 to vibrate or oscillate axially a distance approximately equal to the distance between photodetectors 103 to ensure that all areas of document 115 are read or scanned. Drive roller motors 120 and 124 are activated causing rotation of rollers 119 and 123 in such manner that document 115 and record-receiving member 111 are advanced at about the same speed or in synchronization. That is, the document and copy are advanced together continuously. As document 115 is advanced, it is scanned by photodetectors 103, which send signals 131 to controller 129. Controller 129, in response to input signals 131, provides output signals 133, which trigger the appropriate ink jets 105. In this manner, a copy is formed on sheet 111 corresponding to the document 115. Obviously, signals 134 could be provided from a remote source, for example, facsimile or computer devices, in which case photodetectors 103, document 115 and associated document feed apparatus would not be activated or required; or signals 132 could be transmitted to a remote device.

Although specific methods have been disclosed herein, many modifications and variations will occur to those skilled in the art. Such modifications and variations are intended to be included within the scope of the appended claim.

What is claimed is:

1. A method of printing on an image-receiving surface using an oscillating bar ink jet printer, which comprises:
    (a) advancing said image-receiving surface at a substantially constant rate in a first direction,
    (b) oscillating said bar in a direction substantially at a right angle to said first direction,
    (c) expelling droplets from the oscillating bar as it moves from left to right to form a first row of droplets on said image-receiving surface,
    (d) expelling droplets from the oscillating bar as it moves from right to left to form a second row of droplets,
    (e) repeating steps (c) and (d) at least once, wherein the rows of droplets formed during oscillating bar movement from left to right form a first set of columns, and the rows of droplets formed during oscillating bar movement from right to left form a second set of columns and wherein said first and said second sets of columns are interlaced on said image-receiving surface in a direction substantially at a right angle to said first direction.

* * * * *